United States Patent [19]

Richardson

[11] 4,077,001

[45] Feb. 28, 1978

[54] ELECTROMAGNETIC CONVERTOR WITH STATIONARY VARIABLE-RELUCTANCE MEMBERS

[76] Inventor: Frank B. Richardson, 2610 San Gorgoino, Las Vegas, Nev. 89110

[21] Appl. No.: 677,731

[22] Filed: Apr. 16, 1976

[51] Int. Cl.$^2$ ............................................... G05F 7/00
[52] U.S. Cl. ..................................... 323/92; 307/104; 363/170; 336/110
[58] Field of Search ....................... 336/110, 214, 215; 323/92; 322/46, 49; 321/68

[56] References Cited

U.S. PATENT DOCUMENTS

| | | | |
|---|---|---|---|
| 2,774,935 | 12/1956 | Rademakers et al. | 323/92 X |
| 2,883,604 | 4/1959 | Mortimer | 321/68 |
| 3,368,141 | 2/1968 | Subieta-Garron | 323/92 X |
| 3,517,300 | 6/1970 | McMurray | 321/68 X |
| 4,006,401 | 2/1977 | Villasenor de Rivas | 323/92 |

FOREIGN PATENT DOCUMENTS 1,424,986  2/1976  United Kingdom ................. 336/110

Primary Examiner—Robert J. Hickey
Attorney, Agent, or Firm—Phillips, Moore, Weissenberger, Lempio & Majestic

[57] ABSTRACT

A dc/dc converter comprising a permanent magnet having spaced-apart poles and a permanent magnetic field extending between the poles of the magnet. A variable-reluctance core is disposed in the field in fixed relation to the magnet and the reluctance of the core is varied to cause the pattern of the lines of force of the magnetic field to shift. An output conductor is disposed in the field in fixed relation to the magnet and is positioned to be cut by the shifting lines of permanent magnetic force so that a voltage is induced in the conductor.

53 Claims, 26 Drawing Figures

U.S. Patent  Feb. 28, 1978  Sheet 1 of 6  4,077,001
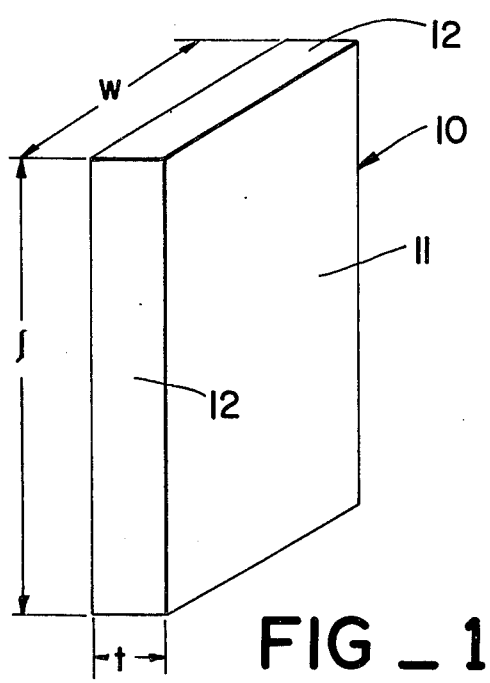
FIG_1
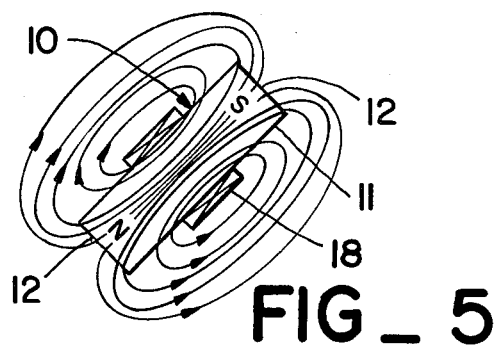
FIG_2
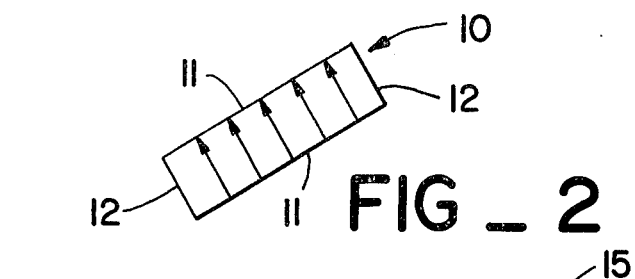
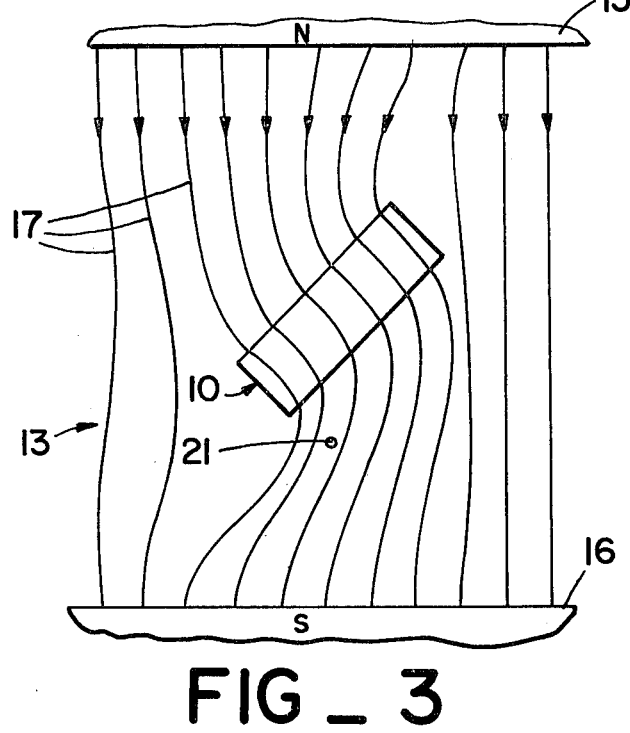
FIG_3
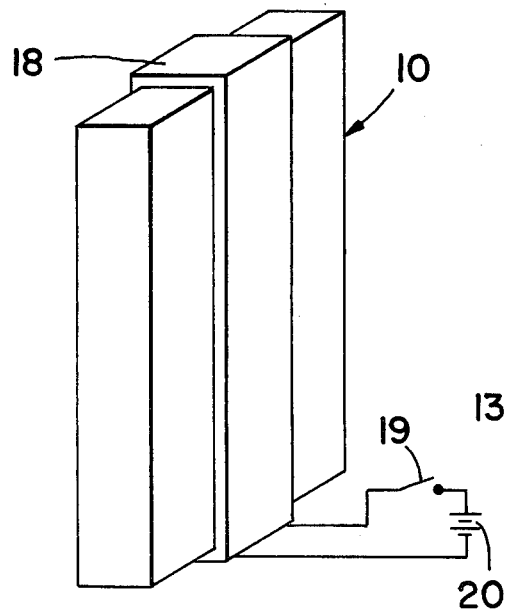
FIG_5
FIG_4
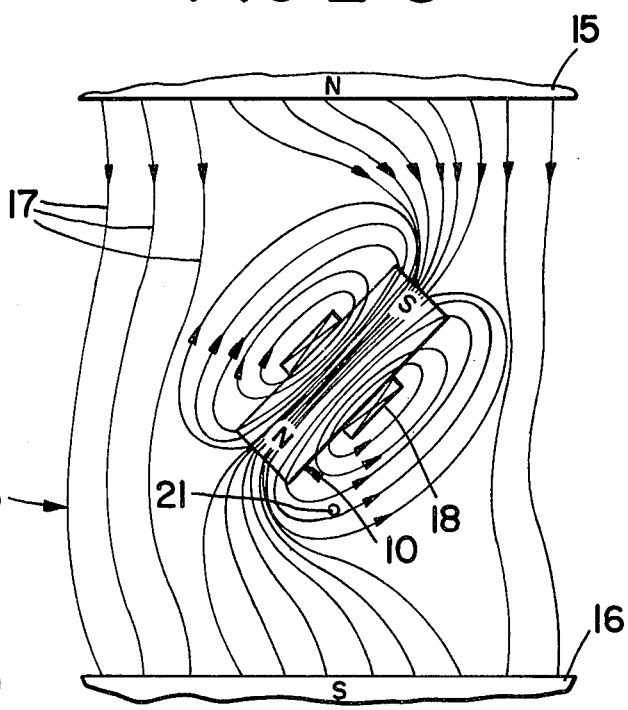
FIG_6

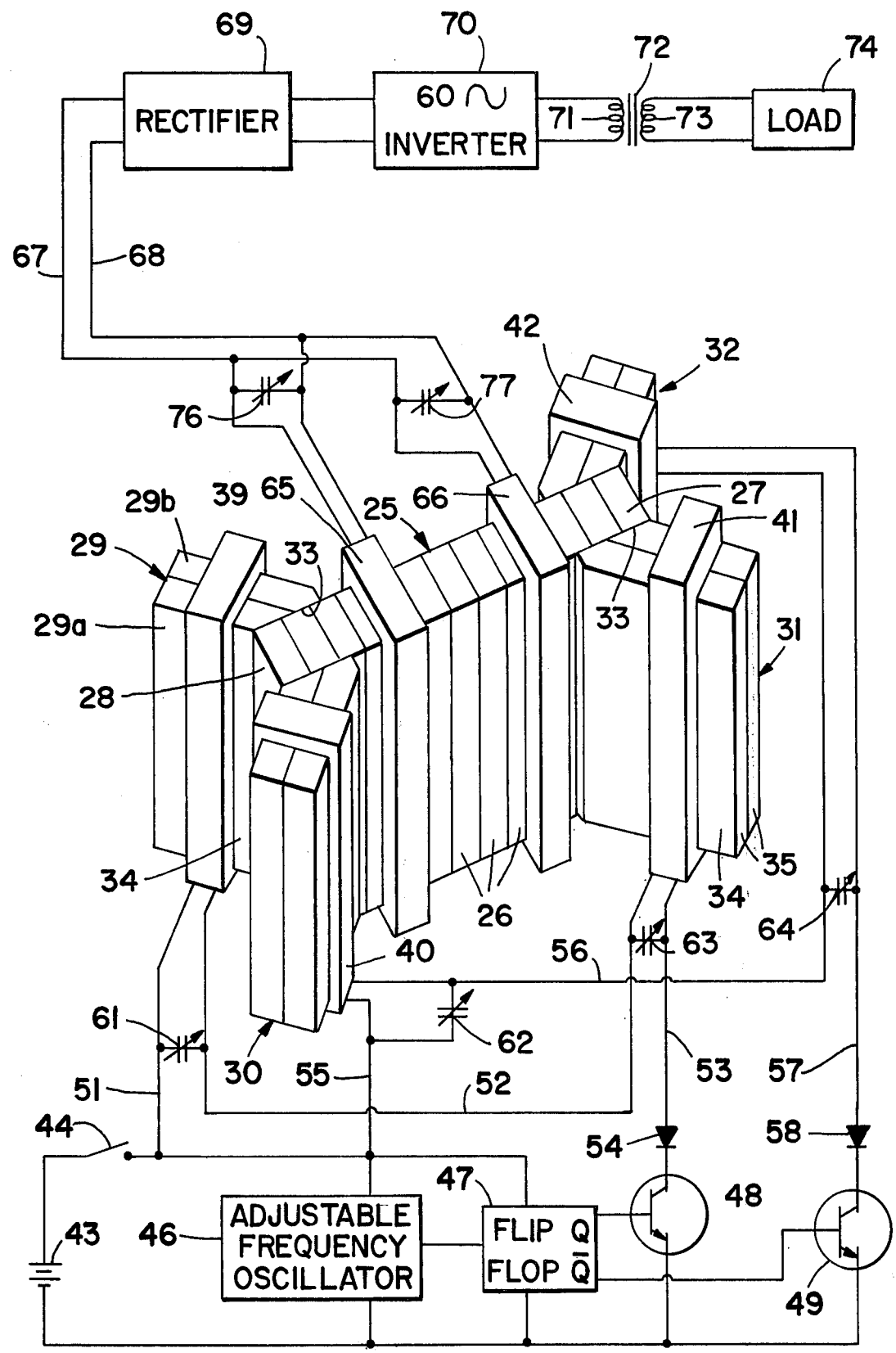
FIG_7

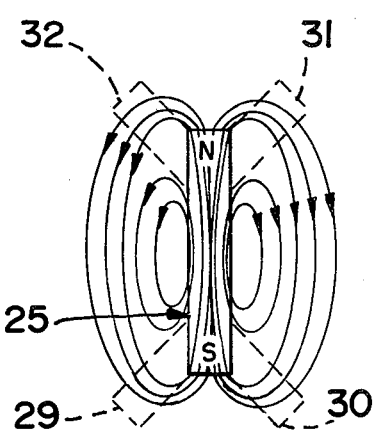
FIG_9
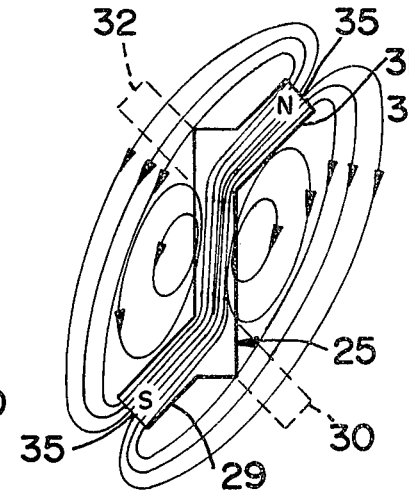
FIG_10
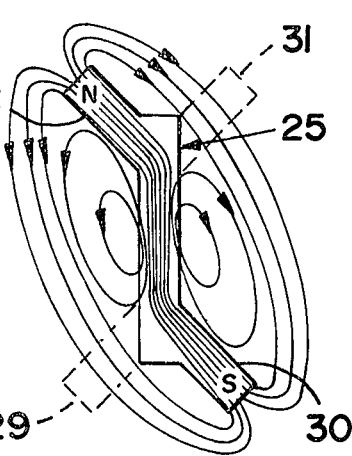
FIG_11
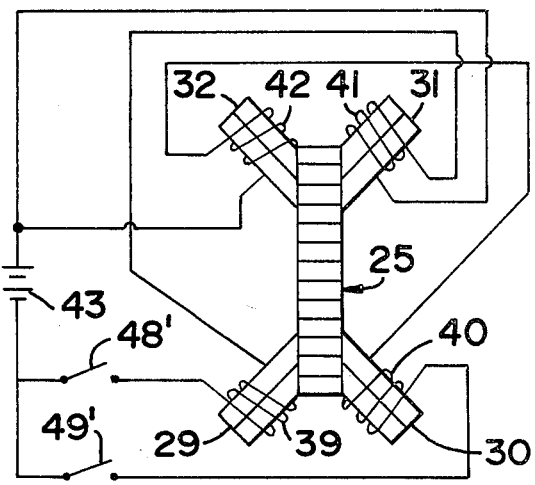
FIG_8
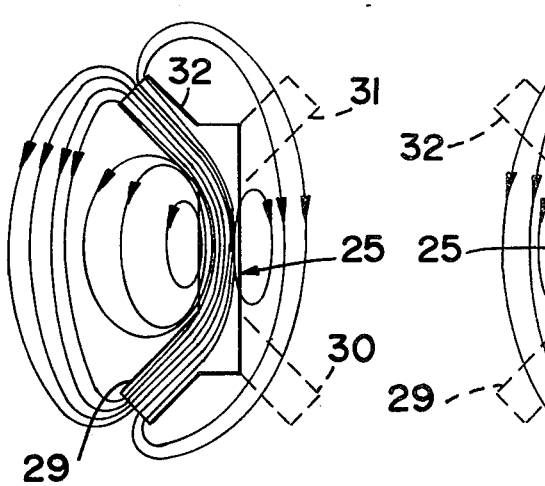
FIG_12
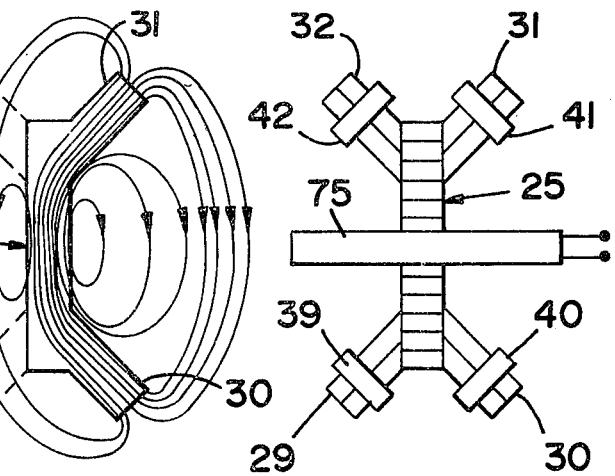
FIG_13
FIG_14

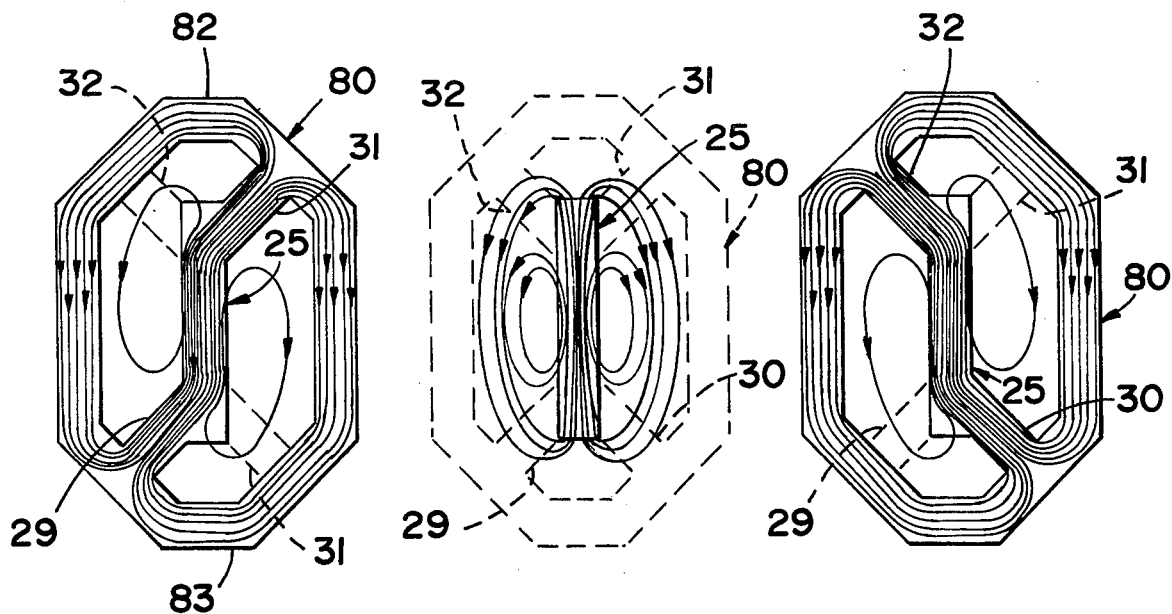
FIG_16  FIG_17  FIG_18
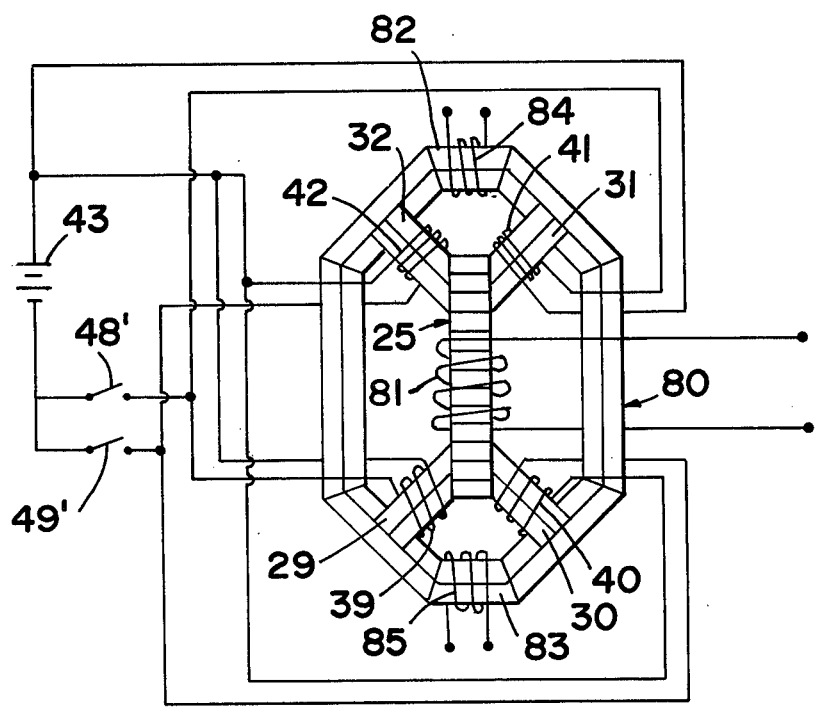
FIG_15

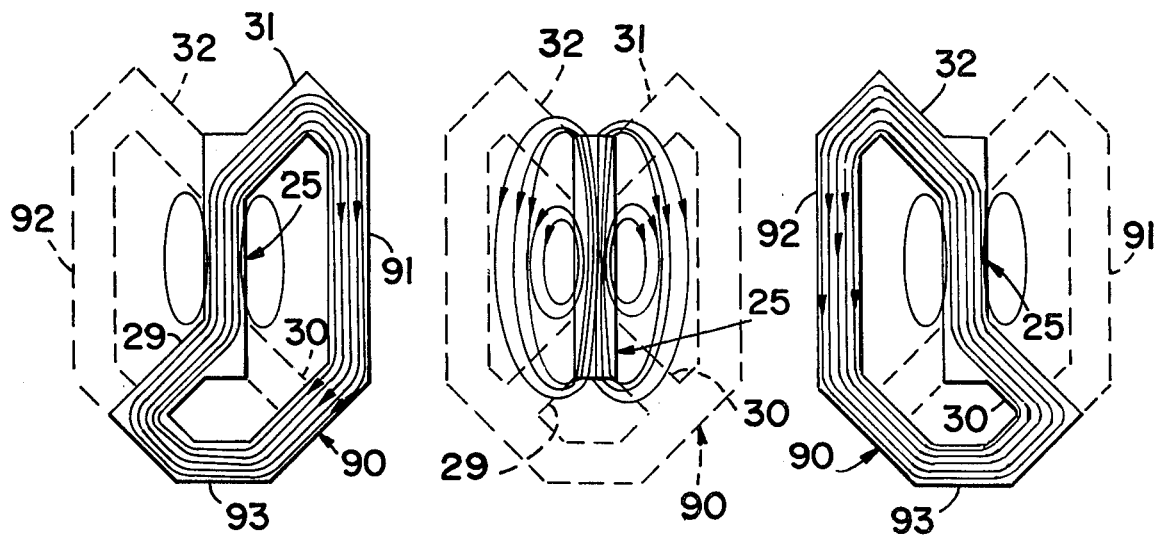
FIG _ 20   FIG _ 21   FIG _ 22
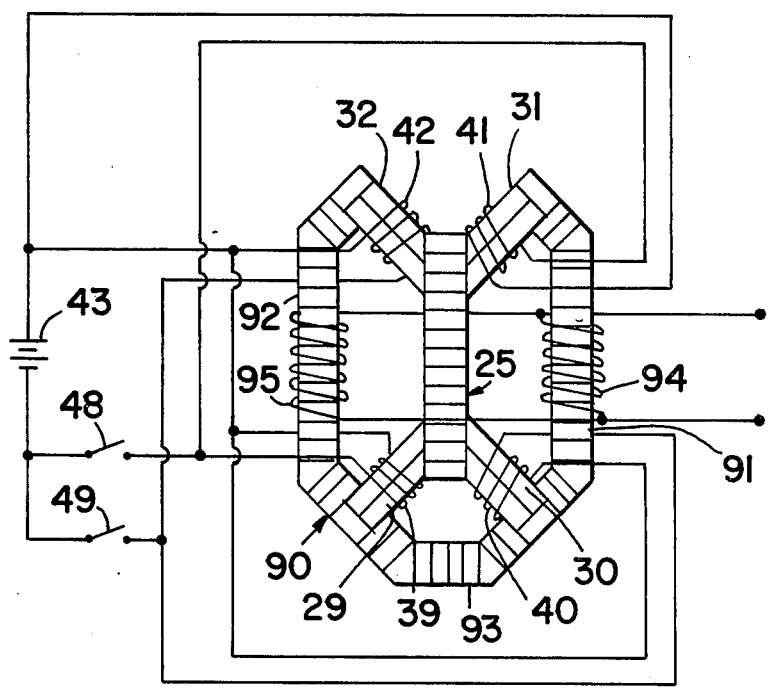
FIG _ 19

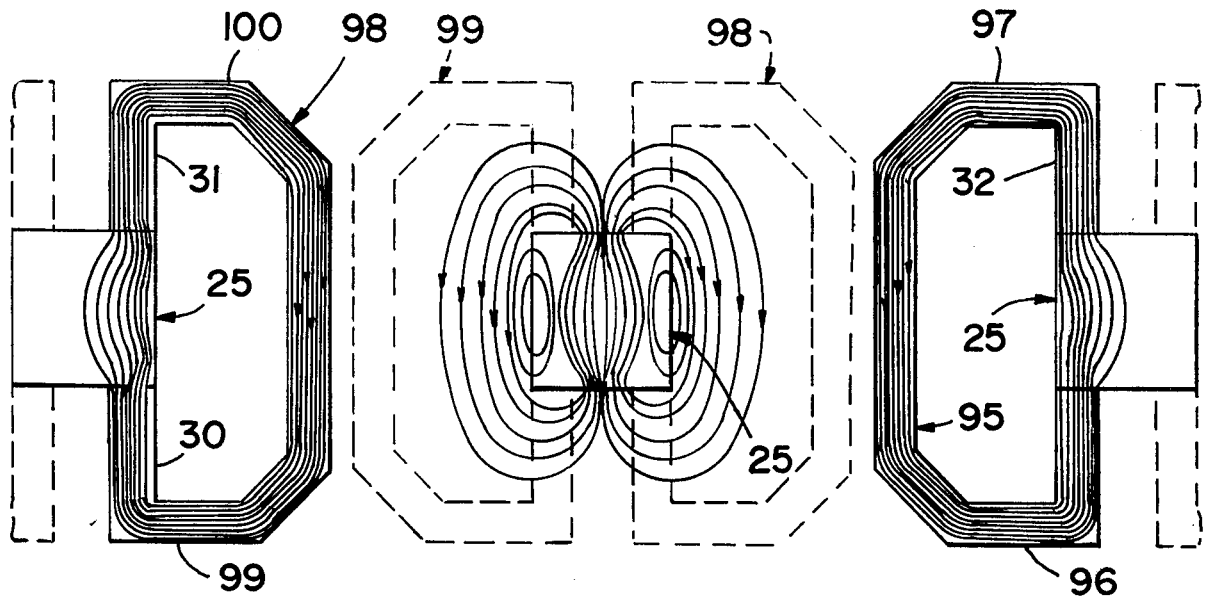
FIG_24  FIG_25  FIG_26
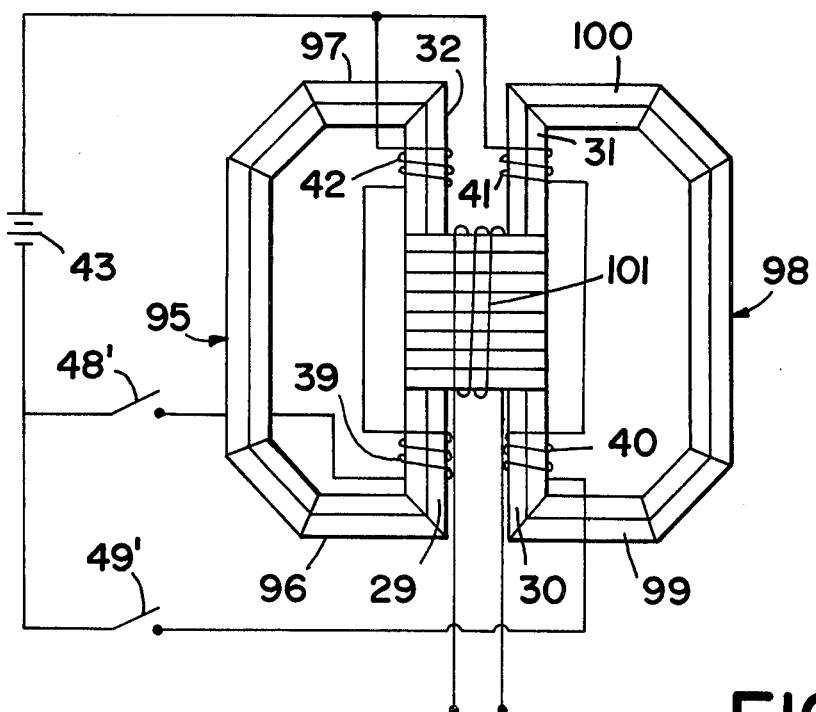
FIG_23

ELECTROMAGNETIC CONVERTOR WITH STATIONARY VARIABLE-RELUCTANCE MEMBERS

BACKGROUND OF THE INVENTION

This invention relates to an energy conversion system having a magnet with spaced-apart poles of opposite polarity, the magnet being permanently magnetized to create an external field having lines of permanent magnetic force extending between the poles of the magnet and there being an electrical conductor positioned in the permanent magnetic field. As is well known, if there is relative movement between the magnetic field and the conductor, such that the conductor is cut by the magnetic lines of force, an electrical voltage will be induced in the conductor. If the ends of the conductor are connected to an electrical load, an output current will flow through the conductor and load.

More specifically, the present invention relates to the manner in which the permanent magnetic field is shifted by the application of electrical power to the system and has for its principal object the provision of a new and novel manner by which dc energy is used to cause a shifting of the permanent magnetic field so as to induce an output voltage and current.

For a given system of such type, the output power will be a function of the number of times that there is a relative movement of the magnetic field and output conductor per unit time. The greater the number of cycles of relative movement per unit time, the greater will be the power output, up to the limit determined by the time constant of the system, i.e., the time required for the voltage to be induced in response to a sudden cutting of a conductor by a relatively moving magnetic field.

It is a further object of the invention to provde an energy conversion system capable of operating efficiently at high frequencies.

SUMMARY OF THE INVENTION

The primary object of the present invention is achieved by positioning a core member in the magnetic field of a permanent magnet, the core member being positioned in fixed relation to the magnet and by varying the magnetic reluctance of the core member at a controlled rate. The changes in magnetic reluctance of the core member will cause distortions in the permanent magnetic field so that the pattern of the lines of force will shift back and forth relative to the magnet. An electrical conductor is also positioned in fixed relation to the magnet and positioned in the field at a location therein so that the warpage and shifting of the permanent magnetic lines of force will cut across the conductor and induce a voltage therein as the reluctance of the core is varied.

More specifically, it has been realized that unmagnetized core members of barium- or strontium- and ferric-oxide material having a stable lamellar pattern of residual induced magnetic distribution and a path of least magnetic reluctance across the shortest, or face-to-face, direction, can be energized by a coil having windings across its faces so that the path of least reluctance extends in an edge-to-edge direction, the direction of least reluctance reverting to the stable direction when de-energized by the coil. It has been further realized that such variable reluctance property can be used to produce shifting of the pattern of a permanent magnetic field.

The utilization of barium- or strontium- and ferric-oxide material is also advantageous in that such material has excellent high-frequency characteristics, permitting operating frequencies at the optimum frequency determined by the time constant of the system.

Other objects and advantages will be set forth in the course of the following detailed description.

BRIEF DESCRIPTION OF THE DRAWINGS

In the drawings, forming a part of this application, and in which like parts are designated by like reference numerals throughout the same, FIG. 1 illustrates a magnetic core of a material having a lamellar distribution of magnetism;

FIG. 2 is a diagram of the stable magnetic distribution of the core of FIG. 1;

FIG. 3 is a diagrammatic representation of the effect of the core of FIGS. 1 and 2 when placed in a uniform magnetic field;

FIG. 4 illustrates the core of FIG. 1 with an excitation coil wound therearound;

FIG. 5 is a diagrammatic representation of the magnetic field of the core of FIG. 4 when the excitation coil is electrically energized;

FIG. 6 is a diagrammatic representation of the effect of the core of FIGS. 4 and 5 on a uniform magnetic field;

FIG. 7 is a perspective view of a magnetic generator constructed in accordance with the invention and with the excitation and output circuits being shown schematically;

FIG. 8 is a simplified illustration of the embodiment of FIG. 7;

FIGS. 9-13 are diagrammatic representations of the magnetic field of the permanent magnet of FIG. 8 for different energizations of the excitation coils;

FIG. 14 is a simplified illustration of the embodiment of FIG. 7, illustrating a modification of the output coil;

FIG. 15 is a simplified illustration of the magnetic generator of FIG. 7 with a keeper ring encircling the ends of the variable-reluctance members;

FIGS. 16-18 are diagrammatic representations of the magnetic field of the permanent magnet of FIG. 15 for different energizations of the excitation coils;

FIG. 19 illustrates, in simplified form, a further modification of the invention, similar to FIG. 15, but with a U-shaped keeper ring;

FIGS. 20-22 are diagrammatic representations of the pattern of the permanent magnetic field for different energizations of the excitation coils;

FIG. 23 illustrates, in simplified form, a further modification of the invention, with separate keeper members;

FIGS. 24-26 are diagrammatic representations of the pattern of the permanent magnetic field for different energizations of the excitation coils.

DESCRIPTION OF THE PREFERRED EMBODIMENTS

The ordinary stable distribution of magnetism along a bar is solenoidal, i.e., the molecules of the magnet are oriented so that the lines of magnetic force extend the length of the magnet with the lines of force passing through the surface of the magnet primarily at the poles located at the ends of the bar.

Magnetic materials are available, however, wherein the stable distribution of induced magnetism is lamellar, with the molecules having a stable orientation in a direction such that the lines of force extend through the shortest direction of the magnet, i.e., from face to face, so that opposed faces have opposite magnetic polarities.

The present invention utilizes the magnetic properties of materials having a lamellar distribution of magnetism.

As for example, permanent magnetic ceramic material comprised of barium-oxide and iron-oxide, or strontium-oxide and iron oxide may be used to make magnets having a lamellar magnetic distribution. For example, iron-oxide and barium-carbonate are blended, pelletized and calcined in a rotary gas furnace to form barium-iron oxide crystals by chemical reaction at high temperatures. The pellets are then pulverized and ball milled to permanent magnet particles approximately 0.00004 inch in diameter. After dewatering, the particles are pressed in slurry form, at very high pressure in the direction of the thickness of the desired shape and in a powerful magnetic field which causes the particles to magnetically orient themselves in the pressed direction. The pressed magnet is then dried and sintered at temperatures about 2000° F. for several days. The material may then be permanently magnetized, with a field of at least 10,000 oersteds or 20,000 ampere/turns per inch being required for saturation. The induced magnetism will have a stable lamellar distribution through the shortest polar direction, from face to face of the magnet.

Permanent magnetic material with a grain orientation as just described is commercially available, in magnetized or unmagnetized form, as for example, from Crucible Magnetics Division of Colt Industries, Elizabethtown, Kentucky.

The magnetic behavior of such material is illustrated in FIGS. 1-6, wherein a magnetic core 10, having a thickness $t$, width $w$, and length $l$ is shown, the core 10 having been formed in a manner as described above. As shown in FIG. 2, the individual particles of which the core 10 is composed set up a field effect in the direction of the shortest polar direction of the core, i.e., between the opposed faces 11 and parallel to the side edges 12 of the core, as indicated by the arrows on FIG. 2.

FIG. 3 illustrates the effect if an unmagnetized core 10 is placed in a uniform magnetic field 13 created as by opposed polarity poles 15 and 16 of permanent magnets, the lines of force of field 13 being represented by lines 17. The magnetic reluctance of core 10 is less than that of air and the lines of force will pass through the core in the direction of stable magnetic orientation of the core imposed therein during manufacture.

If a coil 18 is placed around the core so that the axis of the coil is parallel to the faces 11 of the core and switch 19 is closed so that the coil is electrically energized from battery 20, as in FIG. 4, the current in the coil will set up a magnetic field which will induce magnetic lines of force in the core which extend generally parallel to the faces 11 so that opposed side edges 12 of the core become the magnetic poles, FIG. 5.

FIG. 6 illustrates the effect of the core 10 if it is positioned in magnetic field 13 as in FIG. 3 and the coil 15 is electrically energized. Again, a number of the lines of force 14 will extend through the core but primarily now in the lesser reluctance direction therethrough of the lines of force set up by coil 15.

If the coil 15 is now de-energized, by opening switch 16, the residual field pattern of the magnetism induced in the core by coil 15 will not remain in an edge-to-edge pattern, but will seek and revert to its normal stable orientation across the shortest polar direction of the core, i.e., as in FIG. 2, so that the magnetic lines 14 of field 13 again extend through the core, from face to face thereof as illustrated in FIG. 3.

Thus, the core 10 with its stable lamellar magnetic distribution comprises a variable-reluctance member in which the magnetic reluctance from face to face differs from the magnetic reluctance from edge to edge and, as compared thereto, is relatively high or low depending on whether the coil 15 is electrically energized or de-energized, respectively.

As is seen in FIGS. 3 and 5, the pattern of the lines of force 17 of the magnetic field 13 will shift back and forth as coil 18 is energized and de-energized. If an electrical conductor 21 is disposed in the field, as shown in FIGS. 3 and 6, in fixed relation to the poles 15 and 16 and core 10 and extending perpendicularly to the plane of these figures, and positioned to be cut by some of the lines of force 17 as the field pattern shifts, a voltage will be induced therein by the lines of force each time the coil is energized or de-energized.

The principle described above is utilized in one form of the present invention, as illustrated in FIG. 7. In this instance, a permanent magnet 25 is formed of a plurality of individual core pieces 26 each having a lamellar distribution of magnetism and stacked face to face with adjacent faces being of opposite polarity so that a composite bar magnet is formed having poles of opposite polarity at the ends 27 and 28 of the bar. The bar magnet is permanently magnetized and, if the core material is barium- and ferric-oxide, a residual permanent magnetism in the order of 2950 gauss (lines per square inch) may be induced therein. Merely by way of illustration, the magnet 25 may be made of core pieces 26 each being one inch thick, two inches wide and eight inches long, so that the magnet after magnetization will have a residual magnetism in the order of 63,000 gauss. Core pieces of barium- or strontium- and ferric-oxide are preferably used in the formation of the permanent magnet 25 because of the low hysteresis losses at very high frequencies, for the reasons set forth more fully below.

Variable-reluctance members 29, 30, 31 and 32 are disposed at the ends of the bar magnet 25. Each of these members may be made of two core pieces, e.g., 29a and 29b, each having a lamellar distribution of magnetism, placed face to face against each other. The side edges 33 of the core pieces are formed at an angle to the faces 34 of the core pieces so that the side edges 33 will be flush against the sides of the bar magnet, with no air gap therebetween, with the faces 34 of the core pieces being inclined at an angle to the longitudinal axis of the bar magnet. The side edges 35 of the core pieces opposite from the side edges 33 will thus be disposed away and outwardly from the bar magnet 25. The core pieces of these variable-reluctance members are unmagnetized. Although the members 29–32 are illustrated as made up of two core pieces, a single piece, or more than two may be used. Preferably the cross-sectional area of the cores, in a plane normal to faces 34 is the same as the cross-sectional area of the bar magnet 25.

Coil 39 is disposed around variable-reluctance member 29, with the axis of the coil being parallel to the planes of the faces 34 of member 29, the coil having a suitable number of turns to produce the desired amount of magnetic induction of the member 29 when supplied with electrical current. Coils 40, 41 and 42 are similarly associated with variable-reluctance members 30, 31 and 32, respectively.

A series of direct current, e.g., battery 43, is connected by switch 44 to a variable frequency oscillator 46 whose frequency may be adjusted as desired. The output of the oscillator is fed to flip-flop 47 so that the Q and Q outputs thereof will change at a rate dependent on the frequency of the oscillator. The Q and Q outputs are applied to the bases of power transistors 48 and 49 so that these transistors will conduct alternately. When switch 44 is closed and transistor 48 is conducting, current from battery 43 will flow through switch 44, line 51, coil 40, line 52, coil 41, line 53, diode 54 and transistor 48 back to the battery. If transistor 49 is conducting, current will flow through line 55, coil 30, line 56, coil 42, line 57, diode 58 and transistor 49 back to the battery. Diodes 54 and 58 are provided to protect transistors 54 and 58 from the inductive reactance of the coils when they are de-energized. Adjustment capacitor 61 is connected between lines 51 and 52, i.e., across the inductance of coil 40, so that the circuit can be tuned for resonance and maximum efficiency at the desired frequency of operation. Adjustment capacitors 62, 63 and 64 are similarly associated with coils 40, 41 and 42. The windings of coils 39-42 are wound in a direction so that the magnetic field created by energization thereof will aid the magnetic field of permanent magnet 25 to avoid degaussing of the magnet in operation.

Output coils, for example coils 65 and 66 connected in parallel with each other, will generate an alternating current at the frequency of oscillator 46, which is fed by lines 67 and 68 to rectifier 69 to convert the a.c. output to d.c., the output being fed to a fixed frequency inverter 70, which supplies pulsating d.c. current, e.g., at 60 cycles per second, to primary 71 of transformer 72. The secondary 73 will then deliver a.c. current at the desired voltage and frequency to load 74. Adjustable tuning capacitors 76 and 77 are connected across output coils 65 and 66.

The operation of the system of FIG. 7 is illustrated in FIGS. 8-11, FIG. 8 being a simplified diagram of the FIG. 7 system not including the output coils, and with transistors 48 and 49 being represented by switches 48' and 49' respectively.

With both switches 48' and 49' open, no energizing current will be supplied to any of the coils 39-42 and the only magnetic field present is the field produced by the residual magnetism of permanent magnet 25. The pattern of this field is illustrated in FIG. 9. Since the edge-to-edge magnetic reluctance of the members 29-32 is less than the face-to-face reluctance when the coils are de-energized, the lines of force in the field external to magnet 25 will extend primarily from and between the pole ends of magnet 25, and will extend through the members 29-33 generally perpendicular to the faces 34. Since the faces of members 29-33 are inclined to the longitudinal axis of magnet 25 so that the faces are substantially perpendicular to the lines of force, substantially the same pattern of the lines of force will exist whether the members 29-33 are present or not. Although the flux concentration will be greatest at the ends of magnet 25, considerable lines of force will pass through the surface of magnet 25 along the length thereof. The number of lines of force present in the external field will, of course, equal the number of lines of the residual magnetic force induced in the magnet by the magnetization thereof.

If switch 48' is now closed, coils 39 and 41 will be simultaneously energized, and the current in the coils will induce a magnetic field in members 29 and 31 sufficient to change the edge-to-edge magnetic reluctance so that it is less than the face-to-face reluctance. As a result, the lines of force in magnet 25 will extend through magnet 25 and edge-to-edge through members 29 and 31 so that the side edges 35 of members 29 and 35 become the main poles of the magnet. In a sense, it can be said that energization of coils 39 and 41 has changed the physical shape of the magnet to displace its ends so that the axis of the magnet is now a line drawn between the ends 35 of members 29 and 31. The shift of the magnet axis produces a consequent shift in the external field as illustrated in FIG. 10. As seen, the faces of de-energized variable-reluctance members 30 and 32 are still generally perpendicular to the external lines of force and thus produce little distortion of the shifted field pattern.

If switch 48' is reopened and switch 49' is left open, the de-energization of coils 39 and 41 will allow the residual magnetism in members 29 and 31 to restore to stable lamellar face-to-face distribution so that the permanent magnetic field of magnet 25 shifts back to the pattern of FIG. 9.

Closure of switch 49' will energize both coils 40 and 42, causing a shift of the permanent magnetic field in the opposite direction, as illustrated in FIG. 11. Reopening of switch 49' allows the field to restore to the pattern of FIG. 9.

Thus, as switches 48' and 49' are alternately closed and opened, the pattern of the magnetic field will shift back and forth relative to the center of magnet 25, in substantially the same manner as if magnet 25 were physically oscillated about its center.

The output coil or coils should be located relative to magnet 25 so that the maximum number of lines of force will cut the windings of the coil during the above-described shifting of the field. Although the sequential excitation of coils 29-33 will create additive magnetic lines of force and thereby generate some output current in the output coils by mutual inductance or transformer action, the primary generation of output current will be caused by the shift of the lines of force of the permanent magnetic field relative to the output coil windings.

The shift of the field will depend to some extent on the angle of inclination of the variable-reluctance members to the longitudinal axis of magnet 25. Results show that the optimum angle is at about 45°, but the inclination can be varied considerably therefrom and still produce a usable field shift.

The power output from the system will depend upon the number of lines of force cutting the output coil windings per unit time, and will increase as the rate of shifting of the field increases. For a given system, the power output has an upper limit determined by the time constant of the system, the time constant for magnetic circuits being conventionally defined as the time taken for the output to rise to 63% of its final value when a sudden magnetic excitation is applied. The time constant will depend on all of the parameters of the system involved. For systems as described herein, the maximum frequency of operation may range from 1000 Hertz to several million Hertz. In any event, for a given system, the theoretical power output can be increased by increasing the frequency of field shifting until the upper limit is reached. Increasing the frequency beyond that limit will result in a decreasing output since the system cannot respond that quickly.

An increase in frequency of operation will generally increase the power losses, primarily hysteresis losses. The use of barium- or strontium- and ferric-oxide material is particularly suitable in the present invention because of the very low power loss therein at high-frequency operation.

To optimize performance of the present invention, the oscillator 46 should be set to oscillate at a frequency related to the time constant of the system, and the adjustable capacitors 61–64 and 76 and 77 should be trimmed so that the coils will resonate at that frequency. Although direct current is applied to the excitation coils 39–41, the output voltage and current from coils 65 and 66 will be alternating since it is produced by the resultant back-and-forth shifts of the magnetic field. The frequency of alternation of the output will be the same as the frequency of the oscillator 46 and hence the use of rectifier 69 and inverter 70 to reduce the frequency to a standard value for operation of the load 74 which may be resistive, inductive or capacitive in nature.

It is apparent, from a consideration of FIGS. 8–11, that variable-reluctance members 30 and 32 could be eliminated. In such case alternate but simultaneous energization and deenergization of coils 39 and 41 would cause the permanent magnetic field to shift back and forth from the patterns illustrated in FIGS. 9 and 10. Similarly, if members 30 and 32 were eliminated, a shift of the permanent magnetic field could also be produced by energizing and de-energizing coil 39 and then coil 41. Further, if only one variable-reluctance member, e.g., member 29, were used, alternate energization and de-energization of its coil would create some shift of the permanent magnetic field. In each instance, however, the degree of field shift would decrease substantially as compared to a system wherein four variable-reluctance members are used.

In the four variable-reluctance members described above, excitation coils on opposite sides of the permanent magnet were simultaneously energized. If desired, however, coils 39 and 42 could be simultaneously energized, while leaving coils 40 and 41 de-energized. In such case the pattern of the lines of force in the permanent magnetic field would shift to a pattern as illustrated in FIG. 12. Deenergization of coils 39 and 42 would restore the field to the FIG. 9 position and subsequent energization of coils 40 and 41 would cause the field to shift to the pattern illustrated in FIG. 13. Again, the lateral shifting of the lines in the field can be utilized to cut the winding of the output coil and generate an output voltage as a result. For example, a toroidal output coil 75 having a plurality of windings wound around magnet 25 from close to the magnet to a considerable distance therefrom (FIG. 14) will intercept substantially all of the permanent magnetic lines of force as they shift back and forth.

A modification of the invention is illustrated in FIGS. 15–18. In this case, the permanent magnet 25 and variable-reluctance members 29–32 are arranged as in FIG. 7, each member 29–32 having one of the coils 39–42 associated therewith. A keeper ring 80 extends around and joins the ends of the variable-reluctance members 29–32, ring 80 being in physical contact with the ends of members 29–32 so that there is no air gap therebetween. Preferably the ring 80 is built up of bars or plates of unmagnetized material of the same composition and magnetic properties as those of the variable-reluctance members, the bars or plates being disposed in edge-to-edge or face-to-face relationship around the ring. The cross-sectional area of the keeper ring is preferably the same as that of the variable-reluctance members and the bar magnet. Barium- or strontium- and ferric-oxide material is again preferred because of its high-frequency characteristics.

When both switches 48' and 49' are open, the pattern of the permanent magnetic field will be as illustrated in FIG. 17. With the coils de-energized, the path of least reluctance through members 29–32 is from face to face. Very little of the magnetic flux passes through members 29–32 to the ring 80 and the effect is as if the ring is spaced from magnet 25 by a substantial air gap. Thus, even though the edge-to-edge reluctance of the ring elements is considerably less than that of air, the greatest number of the external lines of magnetic force will be in the region between ring 80 and magnet 25, although some will extend through ring 80.

If switch 49' is closed, coils 39 and 41 will be energized causing the edge-to-edge reluctance of members 29 and 31 to be less than their face-to-face reluctance, so that the ends of these members in effect become the poles of the magnet. Since the ring 80 is in contact with the ends of variable-reluctance members 29 and 31 with no high-reluctance gap therebetween, and since the magnetic reluctance of the ring elements is much less than that of air, a low-reluctance path is formed between the effective poles of magnet 25. As a consequence, substantially all of the magnetic lines of force shift from the pattern of FIG. 17 and extend through the low-reluctance keeper ring.

If switch 48' is opened, coils 39 and 41 are de-energized so that the residual magnetism of members 29 and 31 again restore to a lamellar face-to-face distribution and the magnetic field shifts back to the pattern of FIG. 17. Closure of switch 49' causes coils 40 and 42 to be energized so that the magnetic field pattern shifts again to the position illustrated in FIG. 18.

The net effect is the same as physically moving a low-reluctance keeper into and out of engagement with the ends of a magnet. As will be apparent from a consideration of FIGS. 16–18, in order for the lines of magnetic force to shift back and forth from the keeper ring 80 to the cavity between the ring and magnet 25 so that the lines of force will cut the windings of output coil 81, which may be a single coil, as illustrated in FIG. 15, it is necessary to de-energize one set of coils before energization of the other set so that the field pattern can restore to the FIG. 17 pattern.

It is also apparent, from a consideration of FIGS. 16 and 18, that the direction of the lines of magnetic force in the ends 82 and 83 of the keeper ring is different, depending upon which set of coils 39 and 41 or 40 and 42 is energized. As a consequence output coils 84 and 85 could be wound around these ends of the keeper ring to be energized by the flux reversal in a cycle of operation, even if switches 48' and 49' are operated in such manner that the switches are opened alternately but only opened if the other is closed, i.e., if the field pattern shifts back and forth between the pattern of FIGS. 16 and 18 without restoring to the pattern of FIG. 17.

FIGS. 19–22 illustrate another modification of the invention, similar in design to the embodiment of FIG. 15, but differing therefrom in that keeper 90 is U-shaped, with legs 91 and 92 connected only at end 93. FIGS. 21, 20 and 22 illustrate the pattern of the magnetic field of permanent magnet 25 when both switches 48' and 49' are open, when switch 48' is closed, and when switch 49' is closed, respectively. Since keeper 90 does not connect directly between variable-reluctance members 31 and 32, the full magnetic flux extending through members 31 or 32, depending on which set of coils is energized, will extend through keeper leg 92 or 91, respectively.

As in the other embodiments, the output coil or coils will be disposed in fixed relation to the magnet 25 and positioned so that the windings are cut by the shifting magnetic lines of force. FIG. 19 illustrates an arrangement wherein two output coils 94 and 95 are utilized, these coils being wound around the legs 91 and 92, respectively, of keeper 90. The output coils are illustrated as being electrically connected in parallel, although they could be series-connected or have independent outputs. When electrically connected together, the output coils are connected together with due regard for the polarity of the induced voltages so that the voltages do not oppose each other.

In both of the embodiments of FIGS. 15 and 19, wherein a keeper is used, the external magnetic field of magnet 25 shifts back and forth from a high-reluctance path, i.e., the air cavity between the keeper and magnet 25, as illustrated in FIGS. 17 and 21, and a low-reluctance path through the keeper, as illustrated in FIGS. 16, 18, 20 and 22. Although the reluctance of the external magnetic circuit thus varies, the permanent magnetic flux of magnet 25 does not vary. Likewise, the number of lines of permanent magnetic force in the external magnetic circuit, which equals the number of lines in magnet 25, remain the same. As a consequence, the output is directly related to the degree of permanent magnetization of magnet 25 and the positioning of the output coils in the external field so that the windings thereof are cut by the shifting pattern of the constant number of permanent magnetic lines of force. The excitation coils, 39-42, wound in a direction to aid the permanent magnetic force will provide a variable magnetic field as the coils are energized and deenergized, in addition to the permanent field so that the total flux in the permanent magnet and in the external magnetic circuit will increase from the permanent magnetic flux to a high value and the decrease to the permanent magnetic flux. This variable magnetic field produced by the excitation coils also contributes to other output through mutual induction.

FIGS. 23-26 illustrate another modification of the invention wherein the permanent magnet 25 has relatively broad end pole faces and wherein the variable-reluctance members 29-31 are positioned with their side edges against the end pole faces of magnet 25 so that the longitudinal axis of magnet 25 is parallel to the faces of the variable reluctance members 29-32. A first U-shaped keeper 95 extends from member 29 to member 32 with the keeper legs 96 and 97 being in contacting engagement with the ends of members 29 and 32. A second U-shaped keeper 98 is similarly positioned with its legs 99 and 100 contacting variable-reluctance members 30 and 31.

With switches 48' and 49' both open, the permanent magnetic field of magnet 25 will be as illustrated in FIG. 25. When switch 48' is closed, coils 39 and 42 will both be energized, providing a low-reluctance path to keeper 95, so that the magnetic field of magnet 25 shifts to the pattern illustrated in FIG. 26. Similarly, if switch 48' is open and switch 49' is closed, the pattern of the magnetic field of magnet 25 will shift to the pattern illustrated in FIG. 24.

As illustrated in FIGS. 24-26, the magnetic lines of force of magnet 25 will shift back and forth across the end faces of magnet 25 as the switches 48' and 49' are alternately closed and opened. Output coil 101 may be wound around magnet 25 so that the coil windings will extend across the end faces of the magnet and be cut as field shifts back and forth across the end faces.

In all of the described embodiments, the variable-reluctance members and their excitation coils and the output coils are all positioned in fixed relation to the permanent magnet so that there is no mechanical motion of any of the components. As a consequence, no mechanical losses are present. Further, with no mechanical movement of the components, and with the switching of the excitation coils being performed electronically, there is no mechanical wear of the components and no arcing. The assembly can be easily cased and sealed against hostile environments.

What is claimed is:

1. A converter comprising:
   a. permanent magnet means having spaced-apart poles of opposite polarity and having a permanent magnetic field externally of said magnet means, said field comprising magnetic lines of force extending from pole to pole of said magnet means,
   b. variable-reluctance means for shifting the pattern of said lines of force, said variable-reluctance means having a relatively low magnetic reluctance in one direction therethrough when electrically energized and a relatively high magnetic reluctance in said one direction therethrough when electrically de-energized, said variable-reluctance means being disposed in said permanent magnetic field and in fixed relation to said permanent magnet means, said variable-reluctance means comprising at least one unmagnetized but magnetizable core having spaced-apart faces and side edges extending between said faces, the distance between said faces being the least distance through said core, said core having a lamellar distribution of magnetism from face to face thereof when magnetized,
   c. means for cyclically electrically energizing and de-energizing said variable-reluctance means and including an electrically conductive excitation coil means surrounding said core, the plane of said coil means being substantially inclined relative to the planes of said faces,
   d. electrical conductor means disposed in said permanent magnetic field in fixed relation to said permanent magnet means and having at least one conductor positioned to be cut by lines of magnetic force in said field during a shift in the pattern of said lines of magnetic force.

2. Apparatus as set forth in claim 1 wherein said core is composed of pressed and sintered barium- or strontium- and iron-oxide particles.

3. Apparatus as set forth in claim 1 wherein said core has spaced-apart and opposed side edges one of which is adjacent one of the poles of said permanent magnet means.

4. Apparatus as set forth in claim 3 wherein said one side edge of said core is in physical engagement with said permanent magnet means and the opposed side edge is spaced away from said permanent magnet means.

5. Apparatus as set forth in claim 4 wherein said faces of said core are inclined outwardly from a line extending through said permanent magnet means from pole to pole thereof.

6. Apparatus as set forth in claim 1 wherein said permanent magnet means comprises an elongated bar with the magnetic poles being at the ends of said bar.

7. Apparatus as set forth in claim 6 wherein said core has spaced-apart and opposed side edges one of which is in physical engagement with said permanent magnet bar and adjacent one of the poles thereof and the opposed side edge is spaced away from said permanent magnet bar, and wherein said faces of said core are inclined outwardly from a line extending through said permanent magnet bar from pole to pole thereof.

8. Apparatus as set forth in claim 7, wherein said permanent magnet bar comprises a plurality of permanently magnetized cores each having spaced-apart faces and side edges extending between said faces, the distance between said faces being the least distance through said core, said cores each having a stable lamellar distribution of magnetism from face to face thereof, said cores being stacked face to face with faces of opposite magnetic polarity adjacent each other.

9. Apparatus as set forth in claim 8 wherein the cores of said permanent magnet bar and said variable-reluctance means are composed of pressed and sintered barium- or strontium- and ferric-oxide particles.

10. Apparatus as set forth in claim 1 wherein said permanent magnet means is in the shape of an elongated bar and the magnetic poles are at the ends of said bar, and wherein said variable-reluctance means includes a second unmagnetized but magnetizable core having spaced-apart faces and side edges extending between said faces, the distance between said faces of said second core being the least distance through said second core, said second core having a stable lamellar distribution of magnetism from face to face thereof when magnetized, and wherein said means for energizing said variable-reluctance means includes a second electrically conductive excitation coil means associated with and surrounding said second core, the planes of the faces of said second core being substantially inclined relative to the axis of said second coil means, said cores being spaced from each other and each core having a side edge thereof in physical engagement with said permanent magnet bar and adjacent a magnetic pole thereof.

11. Apparatus as set forth in claim 10, wherein said permanent magnet bar comprises a plurality of permanently magnetized cores each having spaced-apart faces and side edges extending between said faces, the distance between said faces being the least distance through said core, said cores each having a stable lamellar distribution of magnetism from face to face thereof, said cores being stacked face to face with faces of opposite magnetic polarity adjacent each other.

12. Apparatus as set forth in claim 10 wherein said cores of said variable-reluctance means are disposed adjacent the same magnetic pole of said permanent magnet.

13. Apparatus as set forth in claim 12 wherein the faces of both of said cores of said variable-reluctance means are inclined outwardly from a line extending through said permanent magnet bar from pole to pole thereof.

14. Apparatus as set forth in claim 10 wherein said cores of said variable-reluctance means are disposed adjacent opposite magnetic poles of said permanent magnet.

15. Apparatus as set forth in claim 14 and further including a keeper means spaced from said permanent magnet and having a low magnetic reluctance, said keeper means being in physical engagement with and extending from a side edge of one of said cores to a side edge of the other of said cores.

16. Apparatus as set forth in claim 15, wherein said permanent magnet comprises a plurality of permanently magnetized cores each having spaced-apart faces and side edges extending between said faces, the distance between said faces being the least distance through said core, said cores each having a stable lamellar distribution of magnetism from face to face thereof, said cores being stacked face to face with faces of opposite magnetic polarity adjacent each other, and wherein the cores of said permanent magnet and said variable-reluctance means and said keeper means are composed of pressed and sintered barium- or strontium- and ferric-oxide particles.

17. Apparatus as set forth in claim 14 wherein the faces of both of said cores of said variable-reluctance means are inclined outwardly from a line extending through said permanent magnet bar from pole to pole thereof.

18. Apparatus as set forth in claim 17 wherein both of said cores are disposed on the same side of a line extending through said permanent magnet from pole to pole thereof.

19. Apparatus as set forth in claim 17 wherein said cores are disposed on opposite sides of a line extending through said permanent magnet from pole to pole thereof.

20. Apparatus as set forth in claim 1 wherein said permanent magnet means is in the shape of an elongated bar and the poles of said magnet are at the ends of said bar, and wherein said variable-reluctance means includes three additional unmagnetized but magnetizable cores each having spaced-apart faces and side edges extending between said faces, the distance between said faces of said additional cores being the least distance through a core, each additional core having a stable lamellar distribution of magnetism from face to face thereof when magnetized, and wherein said means for energizing said variable-reluctance means includes an additional electrically conductive excitation coil means associated with and surrounding each said additional core, the planes of the faces of each additional core being substantially inclined relative to the axis of the coil means associated therewith, said cores being spaced from each other and each core having a side edge thereof in physical engagement with said permanent magnet bar and adjacent a magnetic pole thereof.

21. Apparatus as set forth in claim 20, wherein said permanent magnet comprises a plurality of permanently magnetized cores each having spaced-apart faces and side edges extending between said faces, the distance between said faces being the least distance through said core, said cores each having a stable lamellar distribution of magnetism from face to face thereof, said cores being stacked face to face with faces of opposite magnetic polarity adjacent each other.

22. Apparatus as set forth in claim 20 wherein two of said cores of said variable-reluctance means are disposed adjacent the other of the poles of said permanent magnet.

23. Apparatus as set forth in claim 22 including a keeper means spaced from said permanent magnet and having a low magnetic reluctance, said keeper means being in physical engagement with and extending from the side edges of the cores at one of the poles of said magnet to the side edges of the cores at the other of the poles of said magnet.

24. Apparatus as set forth in claim 23 wherein said keeper means comprises a first keeper portion extending directly between one of said cores at one of said magnet poles to one of said cores at the other of said magnet poles and a second keeper portion extending directly between the other cores at the poles of said magnet.

25. Apparatus as set forth in claim 24 wherein said keeper means includes a third keeper portion extending directly between the cores at one of the poles of said magnet.

26. Apparatus as set forth in claim 26 wherein said keeper means includes a fourth keeper portion extending directly between the cores at the other of the poles of said magnet.

27. Apparatus as set forth in claim 23, wherein said permanent magnet comprises a plurality of permanently magnetized cores each having spaced-apart faces and side edges extending between said faces, the distance between said faces being the least distance through said core, said cores each having a stable lamellar distribution of magnetism from face to face thereof, said cores being stacked face to face with faces of opposite magnetic polarity adjacent each other, and wherein the cores of said permanent magnet and said variable-reluctance means and said keeper means are composed of pressed and sintered barium- or strontium- and ferric-oxide particles.

28. Apparatus as set forth in claim 22 wherein all of said cores are disposed with the faces thereof inclined outwardly from a line extending through said permanent magnet from pole to pole thereof, two of said cores being on one side of said line and two of said cores being on the other side of said line.

29. Apparatus as set forth in claim 28 wherein said coils associated with cores on the same side of said permanent magnet are electrically connected for simultaneous energization.

30. Apparatus as set forth in claim 28 wherein a coil associated with a core at one pole and at one side of said permanent magnet is electrically connected for simultaneous energization with a coil associated with a core at the other pole and on the opposite side of said permanent magnet.

31. Apparatus as set forth in claim 1 wherein said variable-reluctance means includes a second unmagnetized but magnetizable core having spaced-apart faces and side edges extending between said faces, the distance between said faces of said second core being the least distance through said core, said second core having a stable lamellar distribution of magnetism from face-to-face thereof, one of said cores having a side edge thereof in physical engagement with said permanent magnet means adjacent one pole thereof and the other of said cores having a side edge thereof in physical engagement with said permanent magnet means adjacent the other pole thereof, and wherein said means for energizing said variable-reluctance means includes an excitation coil means associated with said second core, each said coil means including a plurality of windings wound around the core associated therewith with the axis of said windings being substantially inclined from the faces of the core, and wherein said means for energizing said variable-reluctance means further includes a source of direct current, a switching means, excitation circuit means electrically connecting both of said excitation coil means to said source of direct current through said switching means, and oscillator means for closing and opening said switch means at a predetermined frequency.

32. Apparatus as set forth in claim 31 and further including means associated with said excitation coil means for tuning said excitation circuit means to resonance at the frequency of said oscillator.

33. Apparatus as set forth in claim 31 wherein said conductor means comprises an output coil having a plurality of windings, and further including output circuit means connected to said output coil, said output circuit means including a rectifier means connected for converting alternating current output of said output coil to a direct current output and inverter means for converting said direct current output to an alternating current output of predetermined frequency independent of the frequency of said oscillator.

34. Apparatus as set forth in claim 33 and further including means associated with said excitation coil means for tuning said excitation circuit means to resonance at the frequency of said oscillator and further including means associated with said output coil for tuning said output circuit means to resonance at the frequency of said oscillator.

35. Apparatus as set forth in claim 31, wherein said permanent magnet means comprises a plurality of permanently magnetized cores each having spaced-apart faces and side edges extending between said faces, the distance between said faces being the least distance through said core, said cores each having a stable lamellar distribution of magnetism from face-to-face thereof, said cores being stacked face-to-face with faces of opposite magnetic polarity adjacent each other to form an elongated bar magnet.

36. Apparatus as set forth in claim 31 and further including a keeper means spaced from said permanent magnet means and having a low magnetic reluctance, said keeper means extending from side edge of one of said variable-reluctance cores to the side edge of the other of said variable-reluctance cores.

37. Apparatus as set forth in claim 36, wherein said permanent magnet means comprises a plurality of permanently magnetized cores each having spaced-apart faces and side edges extending between said faces, the distance between said faces being the least distance through said core, said cores each having a stable lamellar distribution of magnetism from face-to-face thereof, said cores being stacked face-to-face with faces of opposite magnetic polarity adjacent each other to form an elongated bar magnet, and wherein said keeper means and said cores of said variable-reluctance means and said cores of said permanent magnet are composed of pressed and sintered barium- or strontium- and ferric-oxide particles.

38. Apparatus as set forth in claim 37 and further including means associated with said excitation coil means for tuning said excitation circuit means to resonance at the frequency of said oscillator.

39. Apparatus as set forth in claim 37 wherein said conductor means comprises an output coil having a plurality of windings, and further including output circuit means connected to said output coil, said output circuit means including a rectifier means connected for converting alternating current output of said output coil to a direct current output and inverter means for converting said direct current output to an alternating current output of predetermined frequency independent of the frequency of said oscillator.

40. Apparatus as set forth in claim 39 and further including means associated with said excitation coil means for tuning said excitation circuit means to resonance at the frequency of said oscillator and further including means associated with said output coil for tuning said output circuit means to resonance at the frequency of said oscillator.

41. Apparatus as set forth in claim 1 wherein said variable-reluctance means includes three additional unmagnetized but magnetizable cores each having spaced-apart faces and side edges extending between said faces, the distance between said faces of said additional cores being the least distance through said cores, said additional cores each having a stable lamellar distribution of magnetism from face-to-face thereof, two of the four cores being spaced apart from each other and each having a side edge thereof in physical engagement with said permanent magnet means adjacent one pole thereof and the other two of said cores being spaced apart from each other and each having a side edge thereof in physical engagement with said permanent magnet means adjacent the other pole thereof, and wherein said means for energizing said variable-reluctance means includes an additional excitation coil means associated with each of said additional cores, each of said excitation coil means including a plurality of windings wound around the core associated therewith with the axis of said windings being substantially inclined from the faces of the core, and wherein said means for energizing said variable-reluctance means further includes a source of direct current, first and second switching means, excitation circuit means electrically connecting one of said excitation coils at one pole of said magnet and one of said excitation coils at the other pole of said magnet to said source of direct current through said first switching means and electrically connecting the other two of said excitation coils to said source of direct current through said second switching means, and oscillator means for alternately closing and opening said first and second switching means at a predetermined frequency.

42. Apparatus as set forth in claim 41 and further including means associated with said excitation coils means for tuning said excitation circuit means to resonance at the frequency of said oscillator.

43. Apparatus as set forth in claim 41 wherein said conductor means comprises an output coil having a plurality of windings, and further including output circuit means connected to said output coil, said output circuit means including a rectifier means connected for converting alternating current output of said output coil to a direct current output and inverter means for converting said direct current output to an alternating current output of predetermined frequency independent of the frequency of said oscillator.

44. Apparatus as set forth in claim 43 and further including means associated with said excitation coil means for tuning said excitation circuit means to resonance at the frequency of said oscillator and further including means associated with said output coil for tuning said output circuit means to resonance at the frequency of said oscillator.

45. Apparatus as set forth in claim 41, wherein said permanent magnet means comprises a plurality of permanently magnetized cores each having spaced-apart faces and side edges extending between said faces, the distance between said faces being the least distance through said core, said cores each having stable lamellar distribution of magnetism from face-to-face thereof, said cores being stacked face-to-face with faces of opposite magnetic polarity adjacent each other to form an elongated bar magnet.

46. Apparatus as set forth in claim 45 and further including means associated with said excitation coil means for tuning said excitation circuit means to resonance at the frequency of said oscillator.

47. Apparatus as set forth in claim 45 wherein said conductor means comprises an output coil having a plurality of windings, and further including output circuit means connected to said output coil, said output circuit means including a rectifier means connected for converting alternating current output of said output coil to a direct current output and inverter means for converting said direct current output to an alternating current output of predetermined frequency independent of the frequency of said oscillator.

48. Apparatus as set forth in claim 47 and further including means associated with said excitation coil means for tuning said excitation circuit means to resonance at the frequency of said oscillator and further including means associated with said output coil for tuning said output circuit means to resonance at the frequency of said oscillator.

49. Apparatus as set forth in claim 41 and further including a keeper means spaced from said permanent magnet means and having a low magnetic reluctance, said keeper means having a first keeper portion physically engaging and extending from a side edge of one of said variable-reluctance cores at one pole of said permanent magnet means to a side edge of one of said variable-reluctance cores at the other pole of said magnet means and a second keeper portion physically engaging and extending between side edges of the others of said variable-reluctance cores.

50. Apparatus as set forth in claim 49, wherein said permanent magnet means comprises a plurality of permanently magnetized cores each having spaced-apart faces and side edges extending between said faces, the distance between said faces being the least distance through said core, said cores each having a stable lamellar distribution of magnetism from face-to-face thereof, said cores being stacked face-to-face with faces of opposite magnetic polarity adjacent each other to form an elongated bar magnet, and wherein said keeper means and said cores of said variable-reluctance means and said cores of said permanent magnet are composed of pressed and sintered barium- or strontium- and ferric-oxide particles.

51. Apparatus as set forth in claim 50 and further including means associated with said excitation coil means for tuning said excitation circuit means to resonance at the frequency of said oscillator.

52. Apparatus as set forth in claim 50 wherein said conductor means comprises an output coil having a plurality of windings, and further including output circuit means connected to said output coil, said output circuit means including a rectifier means connected for converting alternating current output of said output coil to a direct current output and inverter means for converting said direct current output to an alternating current output of predetermined frequency independent of the frequency of said oscillator.

53. Apparatus as set forth in claim 52 and further including means associated with said excitation coil means for tuning said excitation circuit means to resonance at the frequency of said oscillator and further including means associated with said output coil for tuning said output circuit means to resonance at the frequency of said oscillator.

* * * * *